Figure 1:
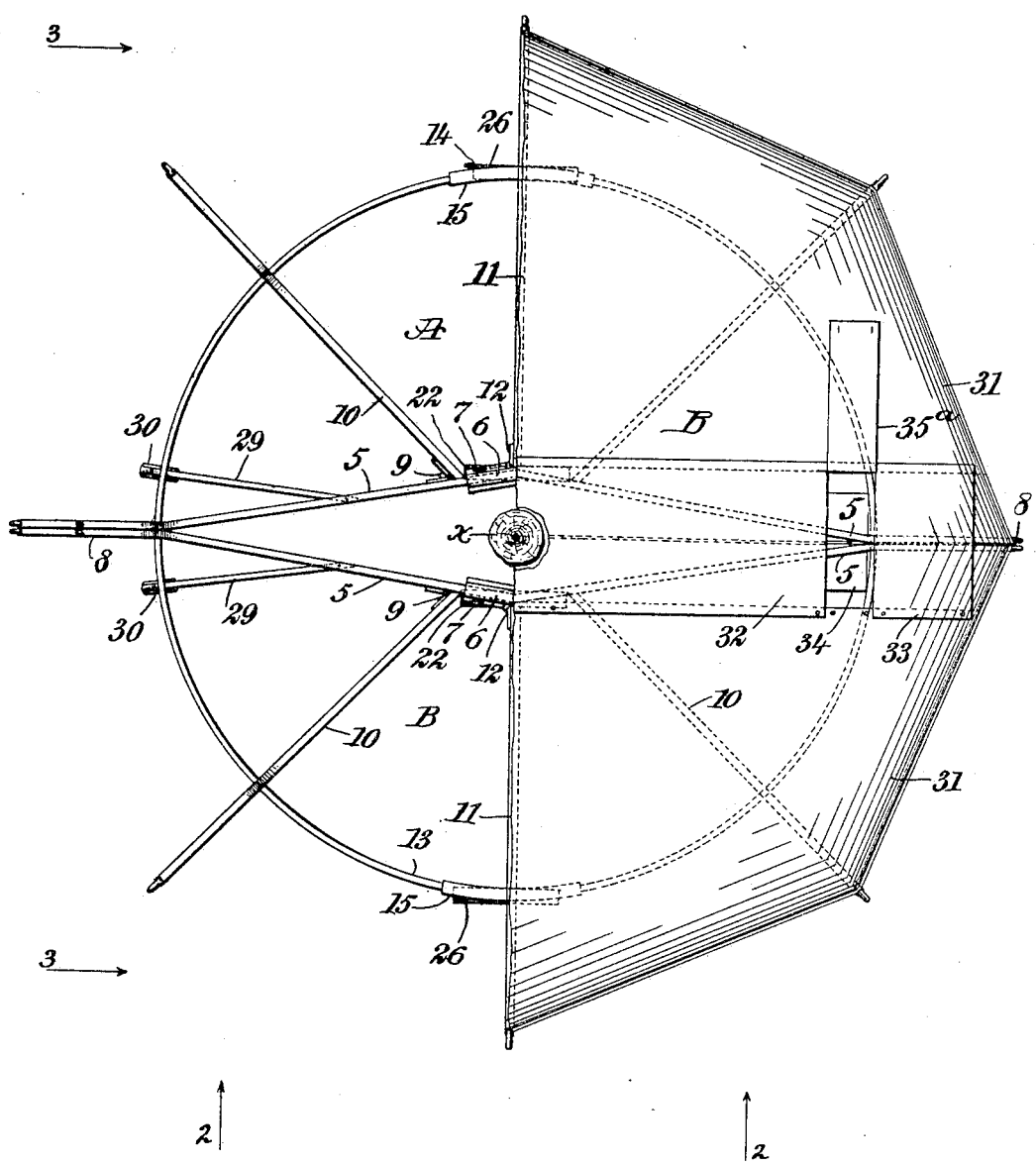

No. 775,248. PATENTED NOV. 15, 1904.
J. R. REID.
FRUIT GATHERER.
APPLICATION FILED OCT. 13, 1903.
NO MODEL. 2 SHEETS—SHEET 1.

WITNESSES:
INVENTOR
James R. Reid
BY
ATTORNEYS

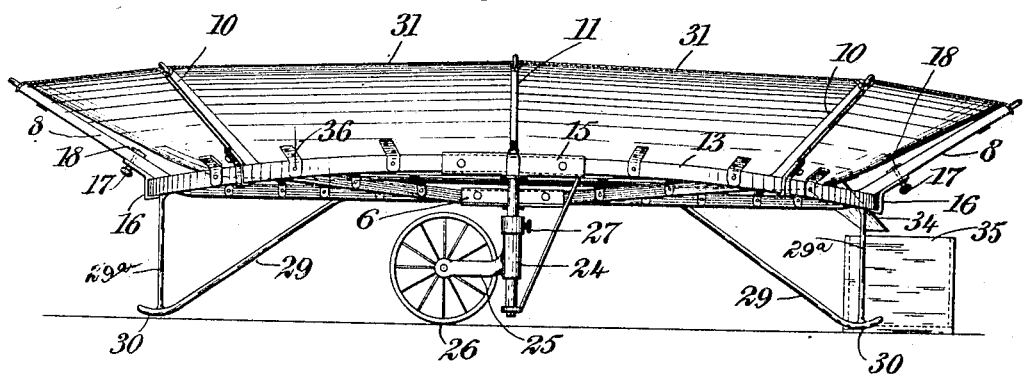
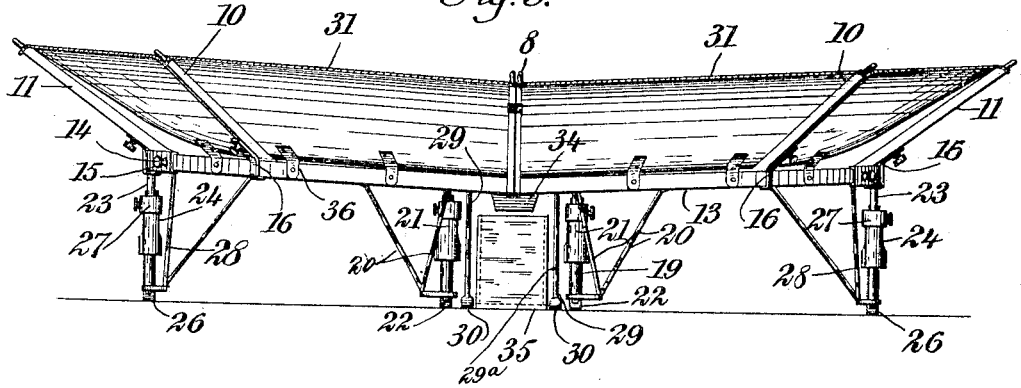
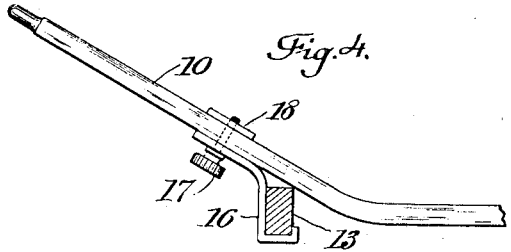

No. 775,248.  
Patented November 15, 1904.

UNITED STATES PATENT OFFICE.

JAMES ROBERT REID, OF VANCOUVER, WASHINGTON.

FRUIT-GATHERER.

SPECIFICATION forming part of Letters Patent No. 775,248, dated November 15, 1904.

Application filed October 13, 1903. Serial No. 176,867. (No model.)

*To all whom it may concern:*

Be it known that I, JAMES ROBERT REID, a citizen of the United States, and a resident of Vancouver, in the county of Clarke and State of Washington, have invented a new and Improved Fruit-Gatherer, of which the following is a full, clear, and exact description.

This invention relates to improvements in fruit-gathering devices.

With some classes of fruit instead of picking it is found more expedient to shake the same from the trees; but the falling of the fruit on muddy or similar ground is objectionable, because of the washing and cleaning that must follow.

It is an object of my invention to provide a simple and inexpensive device adapted to be arranged around a tree below the branches and into which the fruit may fall and from which the fruit may be discharged into a suitable receptacle.

Another object is to so construct the device that it may be easily moved from tree to tree or from one orchard to another, and that may be compactly folded when not in use.

I will describe a fruit-gatherer embodying my invention and then point out the novel features in the appended claims.

Reference is to be had to the accompanying drawings, forming a part of this specification, in which similar characters of reference indicate corresponding parts in all the figures.

Figure 1 is a plan view of a fruit-gatherer embodying my invention with a portion of the top removed. Fig. 2 is an elevation looking in the direction of the arrows 2 2 in Fig. 1. Fig. 3 is an elevation looking in the direction of the arrows 3 3 in Fig. 1. Fig. 4 is a detail showing means for connecting certain of the frame members.

The device comprises a frame consisting of two semicircular sections, as indicated at A B. Each section has oppositely-extended ribs 5, removably engaged in the opposite ends of a socket 6 and secured in position by a thumb-nut 7. It will be noted that the two ribs 5 of the sections are convergent to a certain point and then have parallel portions 8, designed to be engaged together when the device is in operation. Connected to each rib 5 by means of a hinge 9 is a rib 10, and between the two ribs 10 of a section is a rib 11, which has hinge connection 12 with the socket 6. A metal ring 13 is formed in quarter-sections, one end of the sections being secured to the ribs 5, while the adjacent or meeting ends are secured by means of thumb-nuts 14 in sockets 15. The ribs 10 and 11 are rigidly but removably connected to the ring 13 by means of clips 16, which have hook portions for engaging under the ring, and the shanks of these clips are secured to the ribs by means of bolts 17, passing through the ribs and engaging in tapped holes in the clips and in plates 18 on the upper sides of the ribs.

From the socket members 6 rods 19 extend downward and are braced by rods 20. Adjustable on these rods 19 are sleeves 21, having outwardly-extended arms in which bearing-wheels 22 are journaled. Extended downward from the socket members 15 are rods 23, on which sleeves 24 are adjustable, said sleeves having outwardly-extended arms 25, in which the bearing-wheels 26 have their shaft-bearings. Surrounding each depending rod 19 or 23 above the sleeve therein is a collar 27, through which a thumb-screw passes to secure the sleeve as adjusted, and consequently to secure the sleeve in its adjusted position on the rod to cause a slant or incline of the gathering device, as will be hereinafter described. It will be noted that the wheels comprising the pair 22 are near the center of the structure and the wheels 26 are near the periphery, and the several wheels are in axial alinement, thus supporting the device so that it may be readily tilted, and also permitting it to be moved and turned around on the ground. The two rods 23 are braced by rods 28.

Extending downward and outward from each rib 5 is a supporting-rod 29, the lower end 30 of which is slightly broadened, so as not to press into soft ground, and legs 29ª extend from the lower ends of said rod to the frame.

Each section of the frame is provided with a canvas covering 31, said covering being provided at its edges with perforations to receive the reduced ends of the ribs, as clearly illustrated in the drawings. When the two sections of the frame are placed together around a tree, there may be a slight space between the adjacent edges of the canvas 31 of the two sections. To prevent the fruit from passing through said space, I employ a flap 32, of canvas or other suitable material, secured to the cover of one section and adapted to lie loosely upon the cover of the other section, and outward from each end of the flap 32 is a short flap 33, also secured at one end to one top 31 and bearing loosely on the other top. The space between the flaps 30 and 32 is designed to permit the discharge of fruit through a spout 34 into a suitable receptacle 35. It is to be understood that in the operation the device is to be tilted by raising and lowering the necessary wheels, so that the fruit will roll by gravity to the discharge-openings. The opening at the upper portion of the incline may be covered by a flap 35ª.

It will be noted that the several ribs extend outward to the ring 13 in a substantially horizontal plane; but outward of the ring the ribs have an upward inclination, so that the top or covering will substantially form a pan, whereby the fruit will not be discharged over the edges thereof. The canvas top or covering may be removably attached at intervals to the ring 13 or to the sections thereof by means of straps 36.

The operation of the device is quite obvious—that is, the two sections or members of the frame are to be placed around the tree x, as indicated in Fig. 1, and the device tilted as before described. The fruit when shaken from the tree will fall into the canvas top and discharge through the opening into the receptacle or on the ground, as desired. When not in use, the frame-sections may be compactly folded by means of their hinge connections.

Having thus described my invention, I claim as new and desire to secure by Letters Patent—

1. A fruit-gatherer, comprising a sectional frame, a flexible cover therefor, supporting-wheels near the center of the frame, and supporting-wheels near the periphery thereof, the several wheels being in axial alinement.

2. A fruit-gatherer, comprising a frame consisting of sections, each section having a socket member, ribs for engaging in said socket members, ribs having swinging connection with the first-named ribs, ribs having swinging connection with the socket members, and canvas coverings having connection with the ribs.

3. A fruit-gatherer comprising a frame consisting of two sections, each section being formed of radial ribs, several ribs being extended on a substantially horizontal plane for a portion of their length, and then inclined upward, said frame including a sectional ring removably secured to certain of the ribs at the junction of the upwardly-turned portion, with the horizontal portion, supporting-wheels for the frame members, and canvas coverings for the frame members.

4. A fruit-gatherer, comprising a frame consisting of two sections, each section having a socket member, ribs extended outward from opposite ends of said socket member, ribs having hinge connection with said first-named ribs, a rib having hinge connection with the socket member, bearing-rods extended downward from the first-named ribs, a sectional ring with which the several ribs engage, and canvas coverings for the frame-sections.

5. A fruit-gatherer, comprising a frame consisting of sections, each section comprising a plurality of radial ribs, a sectional ring, clips for removably connecting certain of the ribs to said ring, and vertically-adjustable bearing-wheels for the frame.

In testimony whereof I have signed my name to this specification in the presence of two subscribing witnesses.

JAMES ROBERT REID.

Witnesses:
 JOHN O'KEANE,
 JOHN W. TOLLMAN.